United States Patent
Kompella

(10) Patent No.: US 8,532,127 B2
(45) Date of Patent: Sep. 10, 2013

(54) NETWORK ROUTING USING INDIRECT NEXT HOP DATA

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 338 days.

(21) Appl. No.: 12/847,735

(22) Filed: Jul. 30, 2010

(65) Prior Publication Data

US 2010/0296517 A1  Nov. 25, 2010

Related U.S. Application Data

(63) Continuation of application No. 10/045,717, filed on Oct. 19, 2001, now abandoned.

(51) Int. Cl.
*H04L 12/56* (2006.01)

(52) U.S. Cl.
USPC .......................................... 370/408; 709/238

(58) Field of Classification Search
USPC ............... 370/389, 392, 400, 408, 428–429; 709/238–239, 242, 245
See application file for complete search history.

(56) References Cited

U.S. PATENT DOCUMENTS

| | | | |
|---|---|---|---|
| 5,909,440 A | 6/1999 | Ferguson et al. | |
| 6,047,331 A | 4/2000 | Medard et al. | |
| 6,067,574 A | 5/2000 | Tzeng | |
| 6,192,051 B1 | 2/2001 | Lipman et al. | |
| 6,266,706 B1 * | 7/2001 | Brodnik et al. | 709/242 |
| 6,359,858 B1 | 3/2002 | Smith et al. | |
| 6,463,061 B1 | 10/2002 | Rekhter et al. | |
| 6,498,795 B1 * | 12/2002 | Zhang et al. | 370/400 |
| 6,549,519 B1 | 4/2003 | Michels et al. | |
| 6,553,002 B1 | 4/2003 | Bremer et al. | |
| 6,618,760 B1 | 9/2003 | Aramaki et al. | |
| 6,643,706 B1 | 11/2003 | Marques et al. | |
| 6,665,297 B1 | 12/2003 | Hariguchi et al. | |
| 6,693,878 B1 | 2/2004 | Daruwalla et al. | |
| 6,744,774 B2 | 6/2004 | Sharma | |
| 6,857,026 B1 | 2/2005 | Cain | |
| 6,859,455 B1 | 2/2005 | Yazdani et al. | |
| 6,888,838 B1 | 5/2005 | Ji et al. | |
| 6,906,998 B1 | 6/2005 | Mujeeb et al. | |
| 6,999,468 B2 | 2/2006 | Lund et al. | |
| 7,016,379 B2 | 3/2006 | Falkenstein et al. | |

(Continued)

OTHER PUBLICATIONS

Office Action for U.S. Appl. No. 10/197,922 dated Aug. 23, 2006, 11 pp. (now U.S. Patent 7,184,437 to Cole et al.).

(Continued)

*Primary Examiner* — Kevin Mew
(74) *Attorney, Agent, or Firm* — Shumaker & Sieffert, P.A.

(57) ABSTRACT

A router maintains routing information including (i) route data representing destinations within a computer network, (ii) next hop data representing interfaces to neighboring network devices, and (iii) indirect next hop data that maps a subset of the routes represented by the route data to a common one of the next hop data elements. In this manner, routing information is structured such that routes having the same next hop use indirect next hop data structures to reference common next hop data. In particular, in response to a change in network topology, the router need not change all of the affected routes, but only the common next hop data referenced by the intermediate data structures. This provides for increased efficiency in updating routing information after a change in network topology, such as link failure.

19 Claims, 6 Drawing Sheets

(56) References Cited

U.S. PATENT DOCUMENTS

| | | | |
|---|---|---|---|
| 7,058,725 B2 | 6/2006 | Mathew et al. | |
| 7,061,911 B2 | 6/2006 | Furuno | |
| 7,088,717 B2 | 8/2006 | Reeves et al. | |
| 7,184,437 B1 | 2/2007 | Cole et al. | |
| 7,325,071 B2 | 1/2008 | Krishnan | |
| 7,447,149 B1 | 11/2008 | Beesley et al. | |
| 7,512,080 B1 | 3/2009 | Kompella et al. | |
| 7,564,841 B2 * | 7/2009 | Wybenga et al. | 370/389 |
| 7,580,394 B2 * | 8/2009 | Garcia-Luna-Aceves | 370/338 |
| 7,746,790 B1 | 6/2010 | Cole et al. | |
| 7,814,185 B2 | 10/2010 | Choe | |
| 7,903,658 B1 * | 3/2011 | Kireeti et al. | 370/392 |
| 8,018,944 B1 * | 9/2011 | Kopelman et al. | 370/392 |
| 8,189,576 B2 * | 5/2012 | Ferguson et al. | 370/389 |
| 2001/0028651 A1 | 10/2001 | Murase | |
| 2002/0112072 A1 * | 8/2002 | Jain | 709/239 |
| 2002/0143747 A1 | 10/2002 | Tal et al. | |
| 2003/0031167 A1 | 2/2003 | Singh et al. | |
| 2003/0091043 A1 | 5/2003 | Mehrotra et al. | |
| 2003/0179742 A1 * | 9/2003 | Ogier et al. | 370/351 |
| 2003/0198234 A1 | 10/2003 | Pin | |
| 2003/0202520 A1 * | 10/2003 | Witkowski et al. | 370/400 |
| 2003/0235152 A1 | 12/2003 | Shibasaki | |
| 2004/0078625 A1 | 4/2004 | Rampuria et al. | |
| 2004/0205229 A1 | 10/2004 | Stojancic | |
| 2005/0195831 A1 | 9/2005 | Wybenga et al. | |
| 2005/0276215 A1 | 12/2005 | Kitani et al. | |
| 2012/0275459 A1 * | 11/2012 | Ferguson et al. | 370/392 |

OTHER PUBLICATIONS

Response to Office Action for U.S. Appl. No. 10/197,922 dated Sep. 20, 2006, 11 pp. (now U.S. Patent 7,184,437 to Cole et al.).

Notice of Allowance for U.S. Appl. No. 10/197,922 dated Dec. 11, 2006, 7 pp. (now U.S. Patent 7,184,437 to Cole et al.).

Office Action for U.S. Appl. No. 11/670,272 dated Sep. 14, 2009, 10 pp. (now U.S. Patent 7,746,790 to Cole et al.).

Response to Office Action for U.S. Appl. No. 11/670,272 dated Dec. 14, 2009, 10 pp. (now U.S. Patent 7,746,790 to Cole et al.).

Notice of Allowance for U.S. Appl. No. 11/670,272 dated Feb. 24, 2010, 6 pp. (now U.S. Patent 7,746,790 to Cole et al.).

Office Action for U.S. Appl. No. 10/952,457 dated Dec. 14, 2007, 12 pp. (now U.S. Patent 7,447,149 to Beesley et al.).

Response to Office Action for U.S. Appl. No. 10/952,457 dated Apr. 14, 2008, 15 pp. (now U.S. Patent 7,447,149 to Beesley et al.).

Notice of Allowance for U.S. Appl. No. 10/952,457 dated Jul. 28, 2008, 7 pp. (now U.S. Patent 7,447,149 to Beesley et al.).

U.S. Appl. No. 12/411,964 to Bruce Cole et al., filed Mar. 26, 2009.

U.S. Appl. No. 10/045,717 to Kireeti Kompella, filed Oct. 19, 2001.

U.S. Appl. No. 12/820,962 to Bruce A. Cole et al., filed Jun. 22, 2010.

* cited by examiner

|   |   |   |   |
|---|---|---|---|
| 0 | NH10 | IFC10 | PROCESSING MODULE(S) |
| 1 | NH2 | IFC2 | PROCESSING MODULE(S) |
| 2 | NH7 | IFC7 | PROCESSING MODULE(S) |
| 3 | NH3 | IFC3 | PROCESSING MODULE(S) |
| 4 | NH12 | IFC12 | PROCESSING MODULE(S) |
| 5 | NH9 | IFC9 | PROCESSING MODULE(S) |
| ⋮ | ⋮ | ⋮ | ⋮ |
| N-6 | NH1 | IFC1 | PROCESSING MODULE(S) |
| N-5 | NH8 | IFC8 | PROCESSING MODULE(S) |
| N-4 | NH13 | IFC13 | PROCESSING MODULE(S) |
| N-3 | NH5 | IFC5 | PROCESSING MODULE(S) |
| N-2 | NH6 | IFC6 | PROCESSING MODULE(S) |
| N-1 | NH4 | IFC4 | PROCESSING MODULE(S) |

FIG. 3

NETWORK ROUTING USING INDIRECT NEXT HOP DATA

This application is a Continuation of U.S. application Ser. No. 10/045,717, filed Oct. 19, 2001, the entire content of which is incorporated herein by reference.

TECHNICAL FIELD

The invention relates to computer networks and, more particularly, to techniques for routing packets within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet to identify the destination for the packet. Based on the destination, the router forwards the packet in accordance with the routing information.

Conventional routers often maintain the routing information in the form of one or more routing tables. The form and contents of the routing tables often depends on the routing algorithm implemented by the router. Common routing algorithms include distance vector routing algorithms and path vector routing algorithms. Many of these algorithms make use of the concept of a "hop," which refers to a connection between two devices. Consequently, the distance between two devices is often measured in hops. Furthermore, in reference to routing a packet, the "next hop" from a network router typically refers to a neighboring device along a given route.

The physical connection between two devices on a network is generally referred to as a link. Many conventional computer networks, including the Internet, are designed to dynamically reroute data packets in the event of a topology change, such as a link failure. Upon a topology change, the routers transmit new connectivity information to neighboring devices, allowing each device to update its local routing information. Links can fail for any number of reasons, such as failure of the physical infrastructure between the devices, or failure of the devices interfacing with the link. The size and complexity of routing information maintained by routers within large networks can be significant. As a result, updating the routing information due to changes in network topology can consume considerable computing resources and substantially delay rerouting of packets.

SUMMARY

In general, the invention provides for increased efficiency in updating routing information after a change in network topology, such as link failure. According to the principles of the invention, a router maintains routing information that makes use of indirect references to identify the appropriate next hop for each route. In other words, intermediate data structures are introduced, referred to herein as indirect next hop data, between the routing information and the next hop information. The routing information is structured such that routes having the same next hop use indirect next hop data structures to point to common next hop data.

The invention offers many advantages, including reducing the impact and latency of network topology changes by reducing the computer resources required to update the routing information. In particular, in response to a change in network topology, the router need not change all of the affected routes, only the common next hop data referenced by the intermediate data structures. The router can, for example, overwrite the common next hop data with new next hop data. In this fashion, the router can effectively update a large number of routes, and thereby dynamically reroute packets, with minimal changes to the routing information.

In one embodiment, the invention is directed to a method including routing packets within a network using indirect next hop data that associates a plurality of routes with a common portion of next hop data.

In another embodiment, the invention is directed to a method including storing route data representing routes within a computer network, and storing next hop data representing network devices that neighbor a network router. The method further includes storing indirect next hop data that maps at least a subset of the routes represented by the route data to a common portion of the next hop data. The route data may be stored as a radix tree, and the indirect next hop data may be stored as data pointers within leaf nodes of the radix tree.

In another embodiment, the invention is directed to a router comprising a routing engine to store routing information representing a topology of a network. The router further comprises a packet forwarding engine to store packet forwarding information in accordance with the routing information, the packet forwarding information including (i) route data representing destinations within a computer network, (ii) next hop data representing interfaces to neighboring network devices, and (iii) indirect next hop data that maps a subset of the routes represented by the route data to a common portion of the next hop data.

In another embodiment, the invention is directed to a router comprising a computer-readable medium to store: (i) route data representing routes within a computer network, (ii) next hop data representing neighboring network devices, and (iii) indirect next hop data that maps at least a subset of route data to a common portion of the next hop data.

In another embodiment, the invention is directed to a computer-readable medium containing data structures. The data structures include a first data structure to store route data representing destinations within a computer network, a second data structure to store next hop data representing interfaces to neighboring network devices, and a set of indirect next hop data that map at least a subset of the route data to a common portion of the next hop data.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 is a block diagram illustrating an example data structure for resolving next hop data to interface ports or other next hop actions.

DETAILED DESCRIPTION

Figure 1:
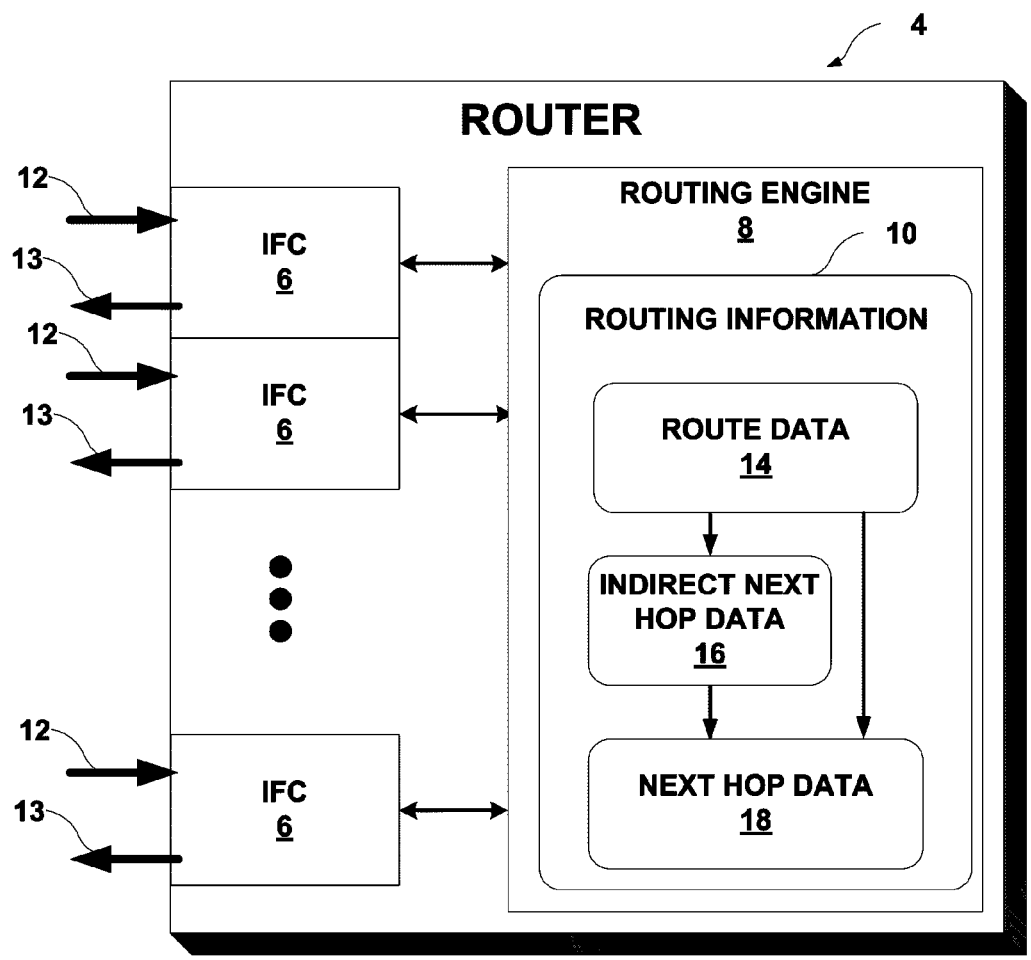
FIG. 1 is a block diagram illustrating an example router configured consistent with the principles of the invention.

FIG. 1 is a block diagram illustrating an example router 4 configured consistent with the principles of the invention. In the exemplary embodiment illustrated in FIG. 1, router 4 includes one or more interface cards (IFCs) 6 for sending and receiving packets using network links 12 and 13. IFCs 6 are typically coupled to network links 12, 13 via a number of interface ports. In general, router 4 receives inbound packets from network links 12, determines destinations for the received packets, and outputs the packets on network links 13 based on the destinations.

Router 4 includes a routing engine 8 that maintains routing information 10, which describes a topology of a network and, in particular, the routes through the network. Routing information 10 may include, for example, route data 14 that describes various routes within the network, and corresponding next hop data 18 indicating appropriate neighboring devices within the network for each of the routes.

Routing information 10 may associate each next hop with one of network links 13 or IFCs 6. In particular, upon receiving an inbound packet, routing engine 8 determines a route within route data 14 for the inbound packet, and examines next hop data 18 of routing information 10 to identify a next hop for the packet. Based on the identified next hop, routing engine 8 determines an interface port associated with the next hop, and forwards the inbound packet to the appropriate IFC 6 for transmission. The architecture of router 4 illustrated in FIG. 1 is for exemplary purposes only. The invention is not limited to this architecture. In other embodiments, router 4 may be configured in a variety of ways. In one embodiment, for example, routing engine 8 and its corresponding functionality may be replicated and incorporated directly within IFCs 6.

According to the principles of the invention, routing information 10 may make use of indirect references to associate routes with corresponding next hops. In other words, routing information 10 may use intermediate data structures, referred to herein as indirect next hop data 16, that maps route data 14 to next hop data 18. In particular, indirect next hop data 16 is structured such that routes that make use of the same next hop from router 4 reference a common portion of next hop data 18. In this manner, router 4 need not maintain separate next hop data for each individual route. In addition, routing information 10 may maintain references that bypass indirect next hop data 16, and associate route data 14 directly with next hop data 18.

In response to a change in network topology, routing engine 8 can dynamically reroute packets for multiple routes by changing a common portion of next hop data 18. More specifically, because routes using the same next hops share a common portion of next hop data 18, routing engine 8 can update next hop data 18 without needing to update route data 14, which can be significantly large for some networks. In this fashion, routing engine 8 can update large number of routes, and thereby quickly reroute packets, with minimal changes to the routing information 10.

Figure 2A:
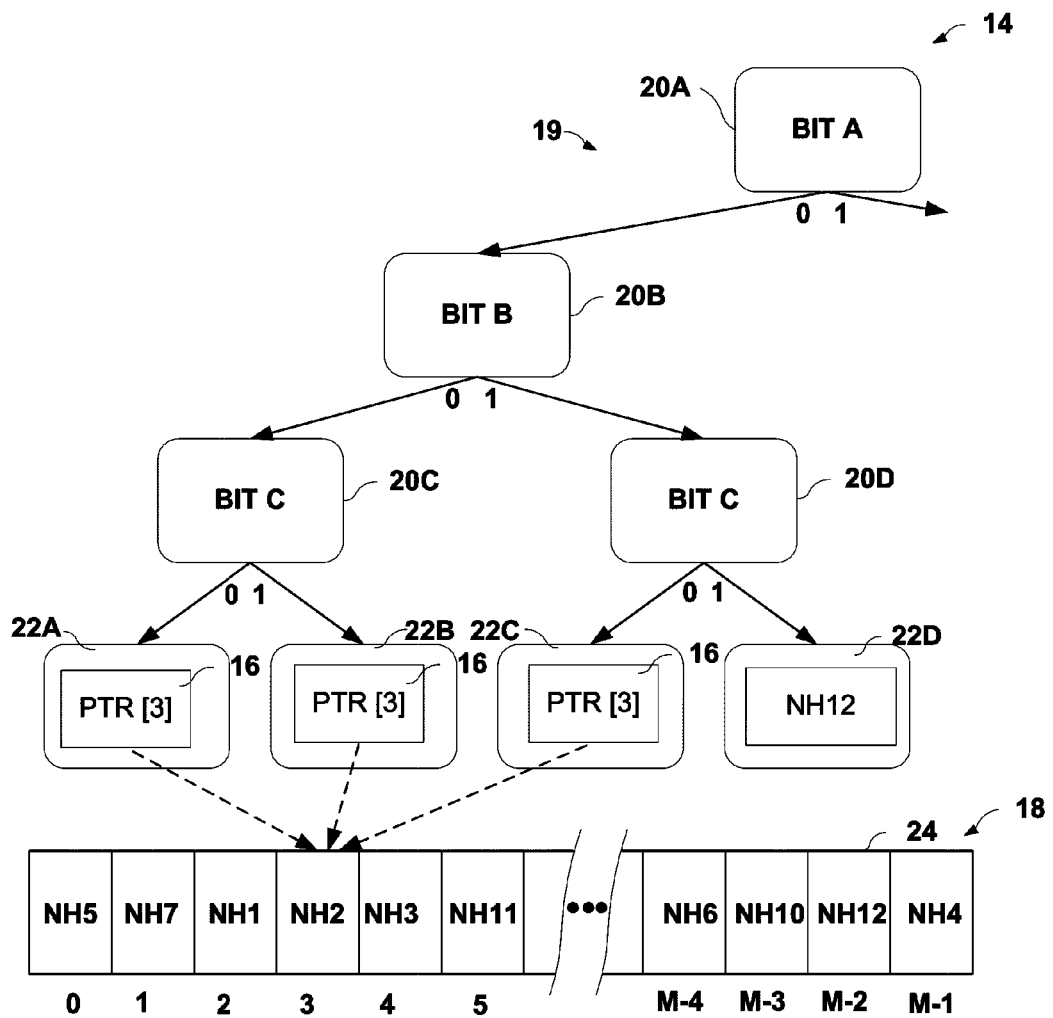
FIG. 2A is a block diagram illustrating data structures for one exemplary arrangement of routing information making use of indirect next hop data.

FIG. 2A is a block diagram illustrating example data structures for one arrangement of routing information 10. In the illustrated embodiment, route data 14 of routing information 10 is arranged as a radix tree 19 that maps network routes to indirect next hop data 16 and next hop data 18. More specifically, radix tree 19 includes a number of leaf nodes 22A, 22B, 22C, 22D, collectively referred to as leaf nodes 22. Each of leaf nodes 22 corresponds to a network route. For large networks, radix tree 19 can become sizable and may easily include over 300,000 leaf nodes 22. Consequently, for exemplary purposes, FIG. 2 depicts a portion of radix tree 19. The arrangement of routing information 10 as a radix tree is illustrated for exemplary purposes. The principles of invention may readily be applied to other arrangements. Routing information 10 may be arranged, for example, as a number of tables, link lists, and other data structures that store pointers to indirect next hop data 16 and next hop data 18.

Figure 2B:
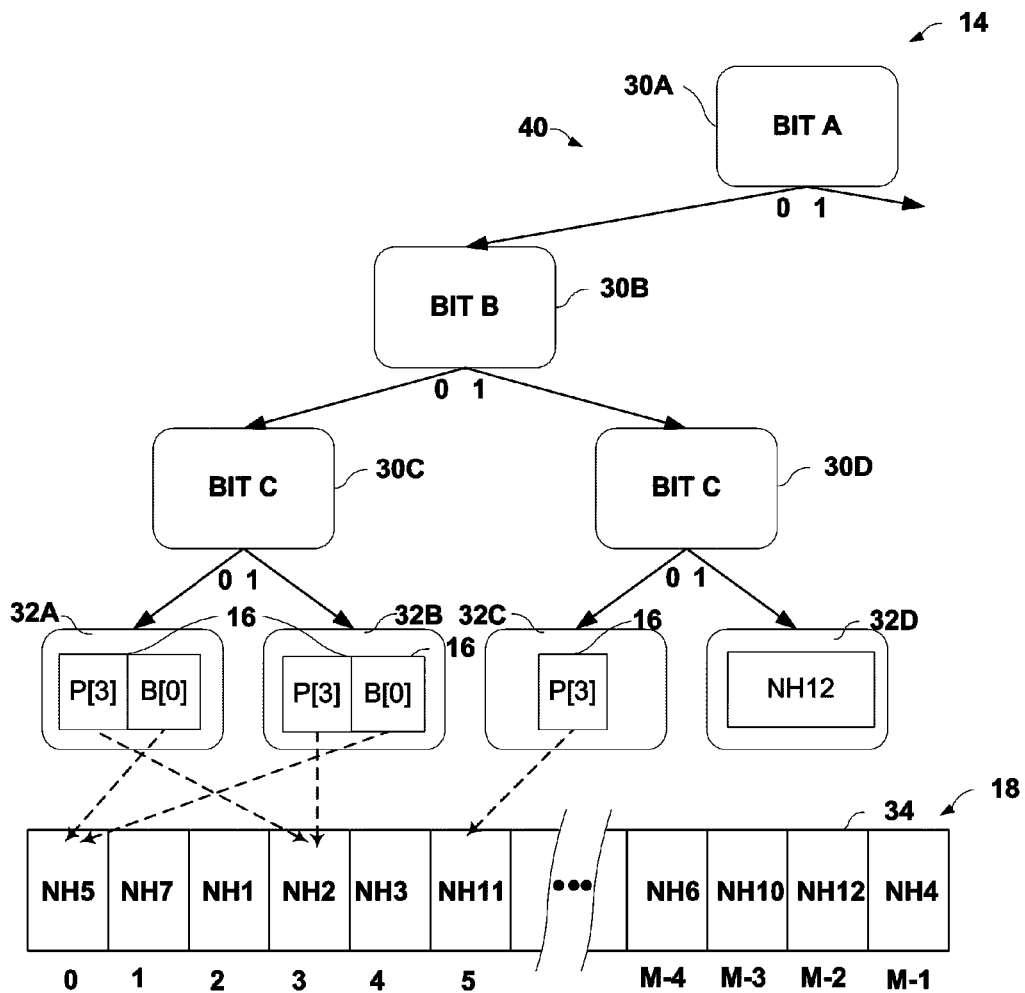
FIG. 2B is a block diagram illustrating data structures for another exemplary arrangement of routing information making use of indirect next hop data.

Upon receiving an inbound packet, routing engine 8 reads a block of data corresponding to the packet, referred to as the "key," that includes a network destination. The key may, for example, contain a routing prefix for another router within the network. Routing engine 8 resolves the key to one of leaf nodes 22 by traversing radix tree 19. In particular, routing engine 8 traverses radix tree 19 by sequentially testing bits A, B and C, which represent any bits within the key. Based on the value of each bit A, B, C, routing engine 8 follows the links of radix tree 19 through the various levels until reaching one of leaf nodes 22. In the example of FIG. 2A, bits A, B and C are labeled 22A, 22B, 22C and 22D. In the example of FIG. 2B, bits A, B and C are labeled 32A, 22B, 22C and 22D.

Leaf nodes 22A, 22B and 22C include indirect next hop data 16 that references an array 24 storing next hop data 18. In particular, the indirect next hop data 16 points to one of the elements of array 24, thereby identifying a corresponding next hop for a respective network destination. In this manner, leaf nodes 22A, 22B and 22C of radix tree 19 do not contain next hop information, but include references to next hop data 18 that is stored in a separate data structure. In this fashion, indirect next hop data 16 provides intermediate data structures that relate route data 14 to next hop data 18. Leaf node 22D stores, however, stores next hop data NH12, and thereby bypasses indirect next hop data 16. In an alternative embodiment, array 24 may store references to specific interface ports, processing modules, or both.

Upon resolving a key of an inbound packet to one of leaf nodes 22A, 22B and 22C, routing engine 8 uses the contained one of indirect next hop data 16 to read next hop data from the referenced element of array 24. In the illustrated example, routing engine 8 resolves a packet key of "010" to leaf node 22C. Routing engine 8 uses the pointer contained within indirect hop data structure 22C to access the fourth element of array 24, i.e., the element with an index equal to 3, thereby resolving the key to next hop data NH2. Upon resolving the destination to a next hop, routing engine 8 determines an interface port associated with the actual next hop NH2, and forwards the inbound packet to the appropriate IFC 6 for transmission.

As illustrated in FIG. 2A, network routes corresponding to leaf nodes 22A, 22B, 22C share a common next hop. In other words, router 4 forwards all packets destined for these routes to the same neighboring network node, i.e., the same next hop. Consequently, according to the principles of the invention, the indirect next hop data 16 within leaf nodes 22A, 22B, 22C reference a common portion of next hop data, i.e., element 3 of array 24. If a network event occurs that requires rerouting packets along these routes, such as failure of the link between router 4 and the neighboring device, routing engine 8 can dynamically reroute the packets by modifying array 24. In particular, routing engine 8 can overwrite the next hop data NH2 of element 3 with new next hop data. In response to a network event, routing engine 8 may, for example, write NH12 to element 3 of array 24, thereby quickly rerouting packets destined for NH2 to an alternate next hop, i.e., NH12.

In this manner, separating route data 14 from next hop data 18 by indirect next hop data 16 provides many advantages. Routing engine 8, for example, need not update radix tree 19 and, in particular, each of leaf nodes 22A, 22B and 22C. In large networks, it is not uncommon for 50,000 or more network destinations to have the same next hop from a routing device. By making use of intermediate references between radix tree 19 and the next hop data stored within array 18, instead of incorporating the next hop data within the radix tree 19, routing engine 8 need not change all of the affected leaf nodes 22, only the common next hop data. In this fashion, router 4 can dynamically reroute packets with minimal changes to the routing information 10.

FIG. 2B is a block diagram illustrating a second exemplary arrangement of routing information 10. In the illustrated embodiment, route data 14 of routing information 10 is arranged as a radix tree 40 that maps network routes to indirect next hop data 16 and next hop data 18. Radix tree 40 includes a number of leaf nodes 32A, 32B, 32C, 32D, collectively referred to as leaf nodes 32.

As illustrated in FIG. 2B, indirect next hop data 16 of leaf nodes 32 may include multiple references to array 34 storing next hop data 18. Leaf nodes 32A and 32B, for example, include primary (P) references and backup (B) references to portions of next hop data 18. For exemplary purposes, the primary references of leaf nodes 32A and 32B reference a common portion of next hop data, i.e., element 3 of array 24. The backup references of leaf nodes 32A and 32B reference a common backup next hop, as identified within element 0 of array 24. In this manner, indirect next hop data 16 for nodes 32A, 32B indicates that next hop NH5 is to be used in the event next hop NH2 fails. Leaf node 32C includes a single primary reference that identifies a portion of next hop data 18.

To generate radix tree 40, routing engine 8 precomputes alternative next hop and adds the alternative next hops to array 34. Based on the alternative next hops, routing engine 8 may include primary and backup references within leaf nodes 32 of radix tree 40, and may mark these references as active or inactive based on the current network topology.

This arrangement may provide a number of advantages when a network event, such as failure of a network link, requires router 4 to reroute packets. In particular, routing engine 8 can quickly reroute the packets from a primary next hop to a backup next hop without regenerating radix tree 40. For routes making use of a failed next hop, routing engine 8 may promote any backup references within corresponding leaf nodes 32 to primary references, and may mark the existing primary references as inactive. In this manner, routing engine 8 can quickly reroute packets to a precomputed backup next hop with minimal changes to routing information 10.

When an inactive next hop becomes available, routing engine 8 identifies those leaf nodes 32 referencing the next hop and marks the references as active. Routing engine 8 may promote the newly activated next hop to a primary next hop, or may designate the next hop as a backup next hop.

FIG. 3 is a block diagram illustrating an example data structure 70 for resolving next hop data 18 to interface ports. In the illustrated embodiment, data structure 70 forms a two-dimensional array having N rows and 3 columns. Each row uniquely associates a next hop with an interface port. Row 0, for example, associates next hop data NH10 with interface port IFC10. Although as illustrated each row maps a next hop to an interface port, data structure 70 could be used to map a next hop to any type of processing module. A row may, for example, map a packet to one of a number of network protocol modules, such as TCP/IP or MPLS, executing on the router for processing. In addition, a row may list zero or more other processing modules including, for example, a packet filtering module, a packet counting module, a policy enforcement module, and a rate-limiting module.

Figure 4:
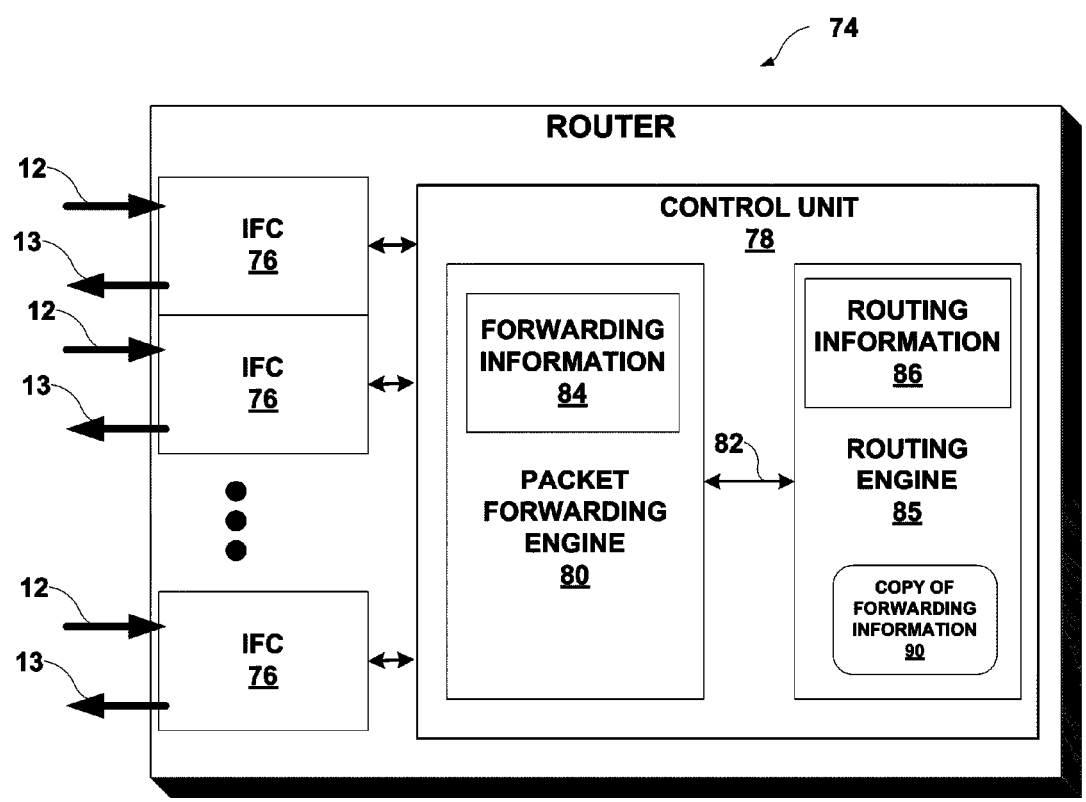
FIG. 4 is a block diagram illustrating another example router configured consistent with the principles of the invention.

FIG. 4 is a block diagram illustrating another example router 74 configured consistent with the principles of the invention. Router 74 includes control unit 78 that directs inbound packets received from inbound link 12 to the appropriate outbound link 13. In particular, the functionality of control unit 78 is divided between a routing engine 85 and a packet forwarding engine 80.

Routing engine 85 is primarily responsible for maintaining routing information 86 to reflect the current network topology. In particular, routing engine 85 periodically updates routing information 86 to accurately reflect the network topology.

In accordance with routing information 86, packet forwarding engine 85 maintains forwarding information 84 that associates network destinations with specific next hops and corresponding interface ports of IFCs 6. Forwarding information 84 may, therefore, be thought of as a subset of the information contained within routing information 86. Upon receiving an inbound packet, forwarding engine 84 directs the inbound packet to an appropriate IFCs 6 for transmission based on forwarding information 84. In one embodiment, each of packet forwarding engine 80 and routing engine 85 may comprise one or more dedicated processors, hardware, and the like, and may be communicatively coupled by data communication channel 82. Data communication channel 82 may be a high-speed network connection, bus, shared-memory or other data communication mechanism.

When a network event occurs, such as a link failure, routing engine 85 updates routing information 86 and directs packet forwarding engine 80 to update forwarding information 84. Routing engine 85 may, for example, communicate one or more messages over data communication channel 82 directing packet forwarding engine 80 to update the next hop data for one or more network destinations.

Forwarding engine 80, routing engine 85, or both, may make use of the data structures and organization described above. In particular, packet forwarding engine 80 may maintain forwarding information 84 so as to make use of indirect next hop data. The indirect next hop data may associate, for example, leaf nodes of a forwarding tree with next hop data. This embodiment may be advantageous in that, in response to an update message from routing engine 85, packet forwarding engine 80 may need only update next hop data that is referenced by the indirect next hop data structures, and not the forwarding tree itself.

In addition, routine engine 85 may organize routing information 86 to include a local copy 90 of forwarding information 84, or portions thereof. This embodiment may be particularly advantageous in reducing the number of messages between routing engine 85 and packet forwarding engine 80. Upon updating routing information 86 due to a change of network topology, routing engine 85 may identify the next hop data to be changed by examining the copy of forwarding information 90. Based on the examination, routing engine 85 may generate a limited number of messages directing forwarding engine 85 to appropriately update next hop data within forwarding information 84. In particular, routing engine 85 may generate a single message directing packet forwarding engine 80 to overwrite a common next hop datum referenced by indirect next hop data structures within leaf nodes of a forwarding tree. This may greatly reduce the number of messages between routing engine 85 and packet forwarding engine 80, primarily because the number of messages is no longer a function of the number of routes affected by the change, as with conventional routers.

Figure 5:
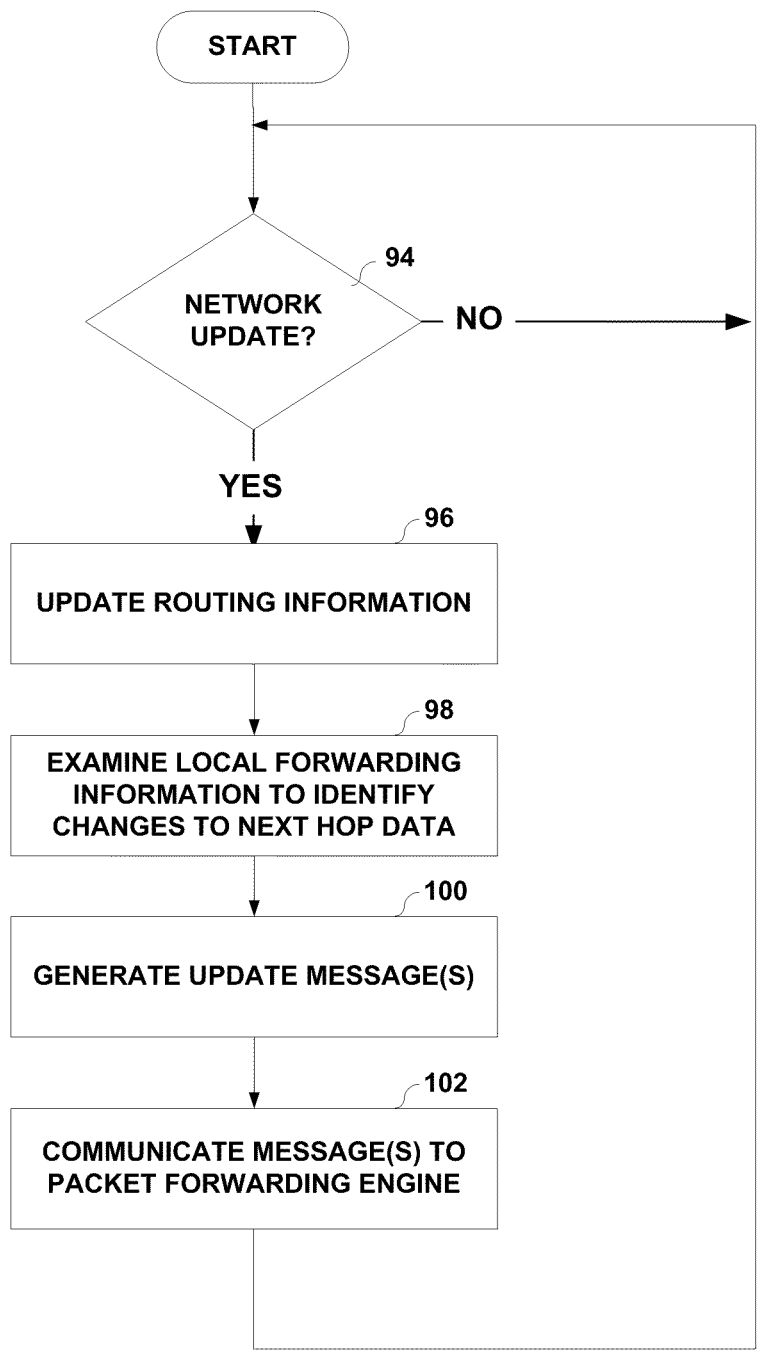
FIG. 5 is a flow chart illustrating an example operation of a router making use of indirect next hop data.

FIG. 5 is a flow chart illustrating an example operation of routing engine 85 consistent with the principles of the invention. Upon receiving new network information from another network node (94), routing engine 85 updates routing information 86 (96). Router 4 may receive, for example, network information via the Border Gateway Protocol (BGP) or other protocol for sharing network information.

After updating routing information 86 (96), routing engine 85 examines a local copy of forwarding information 90 to determine whether packets can be dynamically rerouted by changing next hop data (98). Based on the examination, routing engine 85 may generate one or more update messages directing packet forwarding engine 80 to appropriately update next hop data within forwarding information 84 (100). Routing engine 85 communicates the messages to packet forwarding engine 80 (102) to update next hop data as referenced by indirect next hop data structures within leaf nodes of a forwarding tree within forwarding information 84. As described above, packet forwarding engine 80 may dynamically reroute packets by modifying a common portion of the next hop data, such as an element of an array. Forwarding engine 80 may, for example, write new next hop to one or more elements of the array, thereby quickly rerouting packets to an alternate next hop. In this manner, packet forwarding engine 80 may not need to change the forwarding tree itself, which may greatly reduce the number of messages between routing engine 85 and forwarding engine 80.

Furthermore, packet forwarding engine 80 may promote backup next hop references within corresponding leaf nodes of the forwarding tree to primary next hop references, and may mark existing primary next hop references as inactive. In this manner, packet forwarding engine 80 may quickly reroute packets to a precomputed backup next hop.

Various embodiments of the invention have been described that provide for increased efficiency in updating routing information after a change in network topology, such as link failure. These and other embodiments are within the scope of the following claims.

The invention claimed is:

1. A method comprising:
   storing, within a network router, a forwarding tree that includes a set of hierarchically arranged nodes, wherein the set of nodes includes a root node, a plurality of intermediate nodes, and a plurality of leaf nodes, wherein the leaf nodes store data pointers to data structures that are external to the forwarding tree, and wherein at least two of the leaf nodes each include a corresponding data pointer that points to a same one of the data structures that is external to the forwarding tree;
   receiving, at the network router, a packet to be routed through a network;
   identifying a key within the packet, wherein the key includes a set of bits that identify a network destination for the packet;
   traversing the forwarding tree within the network router, wherein traversing the forwarding tree includes testing the set of bits of the key with respect to different nodes of the set of nodes to traverse a path from the root node though the intermediate nodes to a particular one of the leaf nodes of the forwarding tree, wherein values of the tested bits in the key determine the path that is traversed through the forwarding tree to reach the particular one of the leaf nodes of the forwarding tree;
   upon traversing the forwarding tree and reaching the particular leaf node of the forwarding tree, using a respective data pointer stored within the particular leaf node to identify a respective one of the data structures that is external to the forwarding tree, wherein the data structures that are external to the forwarding tree store next hop data and the respective one of the data structures defines a particular next hop for the packet, the particular next hop being associated with a particular network device coupled to the network router via a network link;
   forwarding the packet to a particular interface port of the network router that is coupled to the network link so as to forward the packet to the particular next hop defined by the respective one of the data structures that is external to the forwarding tree;
   receiving a network update packet at the network router, wherein the network update packet comprises network update information; and
   updating network routes for future packets by modifying the next hop data in the data structures that are external to the forwarding tree without modifying the forwarding tree, wherein modifying the next hop data includes changing a specific next hop identified by the same data pointer that is included in the at least two of the leaf nodes so as to alter routes defined by the at least two of the leaf nodes of the forwarding tree without altering data stored within the leaf nodes.

2. The method of claim 1, wherein the forwarding tree comprises a radix tree.

3. The method of claim 1, further comprising:
   storing, within each of the leaf nodes, a first data pointer to the data structures that are external to the forwarding tree, wherein the first pointer defines a primary next hop; and
   storing, within each of the leaf nodes, a second data pointer to the data structures that are external to the forwarding tree, wherein the second data pointer defines a backup next hop.

4. The method of claim 3, further comprising routing packets to the backup next hop for at least one of the leaf nodes in response to a network event.

5. The method of claim 3, further comprising:
   initially routing packets to the primary next hop for at least one of the leaf nodes; and
   in response to a network event, re-routing the packets to the backup next hop for the at least one of the leaf nodes.

6. The method of claim 1, further comprising:
   storing routing information within a routing engine of the network router;
   generating the forwarding tree and the data structures that are external to the forwarding tree based on the routing information; and
   storing the forwarding tree and the data structures that are external to the forwarding tree within a packet forwarding engine associated with the network router.

7. The method of claim 6, further comprising:
updating the network routes for the future packets by modifying the next hop data in the data structures in response to receiving updates of the routing information in the routing engine.

8. The method of claim 6, further comprising:
updating the forwarding tree and modifying the next hop data in the data structures in response to receiving the updates of the routing information.

9. The method of claim 6, further comprising storing a copy of the routing information in the routing engine and the packet forwarding engine.

10. A network router comprising:
a routing engine that stores a forwarding tree that includes a set of hierarchically arranged nodes, wherein the set of nodes includes a root node, a plurality of intermediate nodes, and a plurality of leaf nodes, wherein the leaf nodes store data pointers to data structures that are external to the forwarding tree, and wherein at least two of the leaf nodes each include a corresponding data pointer that points to a same one of the data structures that is external to the forwarding tree; and
one or more inbound ports that receive a packet to be routed through a network, wherein the routing engine:
identifies a key within the packet, wherein the key includes a set of bits that identify a network destination for the packet;
traverses the forwarding tree within the network router, wherein traversing the forwarding tree includes testing the set of bits of the key with respect to different nodes of the set of nodes to traverse a path from the root node though the intermediate nodes to a particular one of the leaf nodes of the forwarding tree, wherein values of the tested bits in the key determine the path that is traversed through the forwarding tree to reach the particular one of the leaf nodes of the forwarding tree;
upon traversing the forwarding tree and reaching the particular leaf node of the forwarding tree, uses a respective data pointer stored within the particular leaf node to identify a respective one of the data structures that is external to the forwarding tree, wherein the data structures that are external to the forwarding tree store next hop data and the respective one of the data structures defines a particular next hop for the packet, the particular next hop being associated with a particular network device coupled to the network router via a network link;
forwards the packet to a particular interface port of the network router that is coupled to the network link so as to forward the packet to the particular next hop defined by the respective one of the data structures that is external to the forwarding tree;
wherein the one or more inbound ports receive a network update packet at the network router, wherein the network update packet comprises network update information; and
wherein in response to the network update packet, the routing engine updates network routes for future packets by modifying the next hop data in the data structures that are external to the forwarding tree without modifying the forwarding tree, wherein modifying the next hop data includes changing a specific next hop identified by the same data pointer that is included in the at least two of the leaf nodes so as to alter routes defined by the at least two of the leaf nodes of the forwarding tree without altering data stored within the leaf nodes.

11. The network router of claim 10, wherein the forwarding tree comprises a radix tree.

12. The network router of claim 10, wherein the routing engine:
stores, within each of the leaf nodes, a first data pointer to the data structures that are external to the forwarding tree, wherein the first pointer defines a primary next hop; and
stores, within each of the leaf nodes, a second data pointer to the data structures that are external to the forwarding tree, wherein the second data pointer defines a backup next hop.

13. The network router of claim 12, wherein the routing engine routes packets to the backup next hop for at least one of the leaf nodes in response to a network event.

14. The network router of claim 12, wherein the routing engine:
initially routes packets to the primary next hop for at least one of the leaf nodes; and
in response to a network event, re-routes the packets to the backup next hop for the at least one of the leaf nodes.

15. The network router of claim 10, further comprising:
a packet forwarding engine,
wherein the routing engine generates the forwarding tree and the data structures that are external to the forwarding tree based on the routing information, and stores the forwarding tree and the data structures that are external to the forwarding tree in the packet forwarding engine.

16. The network router of claim 15:
wherein the routing engine updates the network routes for the future packets by modifying the next hop data in the data structures of the packet forwarding engine in response to receiving updates of the routing information in the routing engine.

17. The network router of claim 16, wherein the routing engine:
updates the forwarding tree and modifies the next hop data in the data structures in response to receiving the updates of the routing information.

18. The network router of claim 15, wherein both the routing engine and the packet forwarding engine maintain a copy of the routing information.

19. A non-transitory computer-readable medium comprising executable instructions that upon execution in a network router, cause the network router to:
store, within the network router, a forwarding tree that includes a set of hierarchically arranged nodes, wherein the set of nodes includes a root node, a plurality of intermediate nodes, and a plurality of leaf nodes, wherein the leaf nodes store data pointers to data structures that are external to the forwarding tree, and wherein at least two of the leaf nodes each include a corresponding data pointer that points to a same one of the data structures that is external to the forwarding tree;
upon receiving, at the network router, a packet to be routed through a network,
identify a key within the packet, wherein the key includes a set of bits that identify a network destination for the packet;
traverse the forwarding tree within the network router, wherein traversing the forwarding tree includes testing the set of bits of the key with respect to different nodes of the set of nodes to traverse a path from the root node though the intermediate nodes to a particular one of the leaf nodes of the forwarding tree, wherein values of the tested bits in the key determine the path that is traversed through the forwarding tree to reach the particular one of the leaf nodes of the forwarding tree;

upon traversing the forwarding tree and reaching the particular leaf node of the forwarding tree, use a respective data pointer stored within the particular leaf node to identify a respective one of the data structures that is external to the forwarding tree, wherein the data structures that are external to the forwarding tree store next hop data and the respective one of the data structures defines a particular next hop for the packet, the particular next hop being associated with a particular network device coupled to the network router via a network link; forward the packet to a particular interface port of the network router that is coupled to the network link so as to forward the packet to the particular next hop defined by the respective one of the data structures that is external to the forwarding tree; and upon receiving a network update packet at the network router, wherein the network update packet comprises network update information, update network routes for future packets by modifying the next hop data in the data structures that are external to the forwarding tree without modifying the forwarding tree, wherein modifying the next hop data includes changing a specific next hop identified by the same data pointer that is included in the at least two of the leaf nodes so as to alter routes defined by the at least two of the leaf nodes of the forwarding tree without altering data stored within the leaf nodes.

\* \* \* \* \*